US012679037B2

(12) United States Patent
Kuiper-Hartman et al.

(10) Patent No.: US 12,679,037 B2
(45) Date of Patent: Jul. 14, 2026

(54) EXTRUSION BASED ADDITIVE MANUFACTURING

(71) Applicant: DEMCON bond 3D B.V., Enschede (NL)

(72) Inventors: Marloes Alexandra Kuiper-Hartman, Enschede (NL); Nienke Koopmans, Enschede (NL); Johannes Franciscus De Vries, Enschede (NL); Cleiton André Comelli, Enschede (NL); Oana Roxana Ghita, Enschede (NL); Richard Paul Davies, Enschede (NL)

(73) Assignee: DEMCON BOND 3D B.V., Enschede (NL)

( * ) Notice: Subject to any disclaimer, the term of this patent is extended or adjusted under 35 U.S.C. 154(b) by 76 days.

(21) Appl. No.: 18/838,286

(22) PCT Filed: Feb. 14, 2023

(86) PCT No.: PCT/EP2023/053643
§ 371 (c)(1),
(2) Date: Aug. 14, 2024

(87) PCT Pub. No.: WO2023/156387
PCT Pub. Date: Aug. 24, 2023

(65) Prior Publication Data
US 2025/0153441 A1     May 15, 2025

(30) Foreign Application Priority Data
Feb. 15, 2022     (EP) ..................................... 22156793

(51) Int. Cl.
B29C 64/386          (2017.01)
B29C 64/118          (2017.01)
(Continued)

(52) U.S. Cl.
CPC .......... B29C 64/386 (2017.08); B29C 64/118 (2017.08); B29C 64/188 (2017.08);
(Continued)

(58) Field of Classification Search
CPC ... B29C 64/386; B29C 64/118; B29C 64/188; B29C 64/209; B33Y 10/00; B33Y 50/00;
(Continued)

(56) References Cited

U.S. PATENT DOCUMENTS

2018/0047864 A1* 2/2018 Kellerman .............. C30B 15/20
2019/0030822 A1* 1/2019 Touma ................... B33Y 50/02
(Continued)

OTHER PUBLICATIONS

Yang, C., Influence of thermal processing conditions in 3D printing on the crystallinity and mechanical properties of PEEK material, Journal of Materials Processing Tech., 2017, pp. 1-7, vol. 248, doi:.org/10.1016/j.jooatprotec.2017.04.027 Elsevier B.V.

*Primary Examiner* — Nahida Sultana
(74) *Attorney, Agent, or Firm* — Hudak, Shunk & Farine Co. LPA

(57) ABSTRACT

An additive manufacturing method in a heatable build room. A semi-crystalline modelling material is deposited through a nozzle on a build base or on a previously deposited slice. The crystallinity (%) of the modelling material of the previously deposited slice is above a remaining crystallinity threshold. The crystallinity, at least at a region where a new track is deposited by the printhead on said previously deposited slice, and within a time range of 0-5 sec. after the new track is deposited, is controlled such that the crystallinity by default is going below the remaining crystallinity threshold and such that it selectively is maintained above said remaining crystallinity threshold, or the other way around. The crystallinity being controlled by e.g. controlling the temperature of the build room or of the nozzle; or
(Continued)

selectively and locally cooling or heating the object at the region where the next track is deposited.

20 Claims, 10 Drawing Sheets

(51) Int. Cl.
| | |
|---|---|
| *B29C 64/188* | (2017.01) |
| *B29C 64/209* | (2017.01) |
| *B29K 71/00* | (2006.01) |
| *B33Y 10/00* | (2015.01) |
| *B33Y 50/00* | (2015.01) |
| *G05B 19/4099* | (2006.01) |

(52) U.S. Cl.
CPC ............ *B29C 64/209* (2017.08); *B33Y 10/00* (2014.12); *B33Y 50/00* (2014.12); *G05B 19/4099* (2013.01); *B29K 2071/00* (2013.01); *B29K 2995/004* (2013.01); *B29K 2995/0077* (2013.01); *G05B 2219/49023* (2013.01)

(58) Field of Classification Search
CPC .......... B29K 2071/00; B29K 2995/004; B29K 2995/0077; G05B 19/4099; G05B 2219/49023
See application file for complete search history.

(56) References Cited

U.S. PATENT DOCUMENTS

| | | | |
|---|---|---|---|
| 2020/0298509 A1 | 9/2020 | Takai et al. | |
| 2021/0069981 A1* | 3/2021 | Vahora | ................... B33Y 70/10 |
| 2021/0355309 A1* | 11/2021 | Soares | ................... C09D 11/38 |

* cited by examiner

'A'

Detail 'A' (5:1)

| Print job # | T extrudate [°C] | T buildroom [°C] | T conditioner [°C] | 6-Star print result |
|---|---|---|---|---|
| 28604 | 450 | 270 | 270 | 28604 |
| 28700 | 430 | 270 | 270 | 28700 |
| 28701 | 450 | 250 | 250 | 28701 |
| 28766 | 430 | 220 | off | 28766 |
| 28762 | 450 | 250 | 200 | 28762 |
| 28819 | 450 | 250 | 150 | 28819 |
| 28695 | 430 | 220 | 120 | 28695 |

Fig. 17A
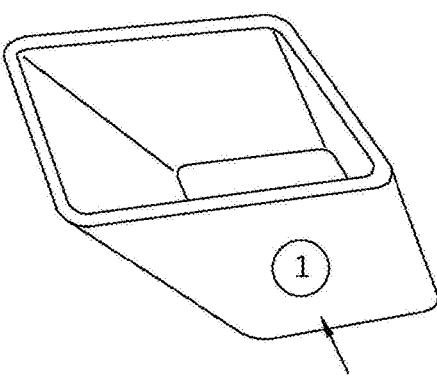
Fig. 17B
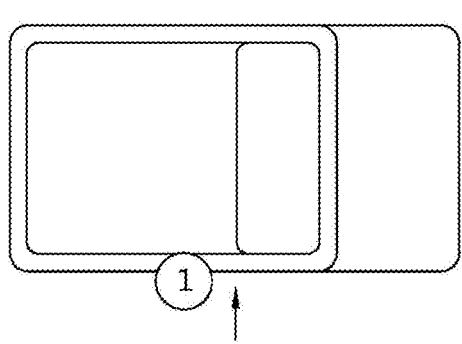
Fig. 18A
| Print job # | T extrudate [°C] | T buildroom [°C] | T conditioner [°C] |
|---|---|---|---|
| 29279 | 450 | 270 | 270 |
| 29285 | 450 | 250 | 200 |
| 29336 | 430 | 220 | 120 |
Fig. 18B
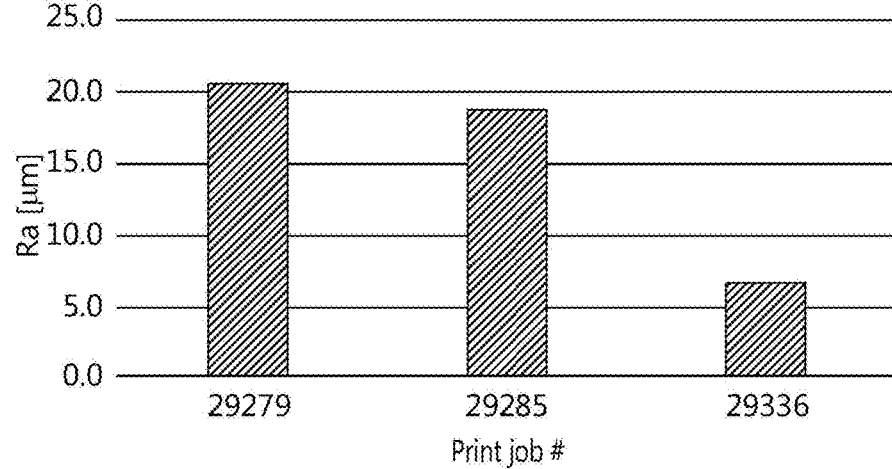
⊠ Surface roughness side 1

EXTRUSION BASED ADDITIVE MANUFACTURING

FIELD OF THE INVENTION

The present invention relates to extrusion based additive manufacturing.

BACKGROUND OF THE INVENTION

In additive manufacturing objects are formed by layering modelling material in a controlled manner such that a desired three dimensional shaped object can be created. Very often a 3D printer used for this process has a two or three dimensionally moveable printhead which dispenses the modelling material, while the printhead is moved over previously deposited tracks of the modelling material.

The object to be printed can be placed on a build base. The printhead and/or the base are/is movable in a three dimensional space such that the printhead and the object being modelled or printed are moveable relative to each other. Various combinations are possible for moving the object on which the object is modelled relative to the printhead and vice versa.

The motions of the printhead and/or the base are controlled by a control system which controls a controllable positioning system to which the printhead and/or the base is attached. By means of software a pattern of tracks can be designed, which pattern is used for moving the printhead and for depositing the tracks of modelling material.

The object is created on a base structure in a reference location relative to the printhead. A preferred example of extrusion based modelling is fused deposition modelling (FDM), in which the modelling material fuses with previously formed tracks. The additive manufacturing modelling material can be fed in the printhead in the form of for example solid filaments or rods, whereafter the modelling material is heated and liquified in the printhead. The printhead dispenses the liquified modelling material from the printhead through a nozzle and deposits it on the base in the form of tracks forming a layer or a slice of tracks, or, if a previous layer of the object to be created has been deposited, on the object on previously deposited tracks, which will be referred to as the substrate in the following. On the substrate the deposited material is allowed to solidify and fuse with the previously deposited tracks.

The relative motion of the base and object to the printhead in tracks and simultaneous deposition of modelling material from the printhead allow the fused deposition modelled object to grow with each deposited track and gradually attain its desired shape.

The additive manufacturing process takes place in a build room, which is essentially a sort of oven. A sufficiently high build room temperature is required to obtain a sufficiently strong interlayer bond between the substrate and the tracks deposited by the printhead. Depending on the modelling material used, the build room requires a certain temperature range in which it is controlled.

SUMMARY OF THE INVENTION

The present invention in particular relates to extrusion based additive manufacturing using a semi-crystalline polymer. In a fully melted state such a semi-crystalline polymer has a minimum crystallinity of 0%. In practise, in the fully melted state, there may be a small residual minimum crystallinity of 0.01% or 0.05%.

One aspect of the invention relates to a method for manufacturing a three dimensional object by additive manufacturing (extrusion based modelling), wherein tracks of modelling material are deposited in slices by means of a printhead inside a heat able build room, said printhead being connected to a three dimensional positioning system, wherein in each slice a plurality of tracks of a (semi-) crystalline modelling material is deposited through a nozzle of the printhead on a build base or on the tracks of a previously deposited slice, whereby a body is formed by depositing the modelling material slice by slice, wherein:

the crystallinity (%) of the modelling material of said previously deposited slice is above a remaining crystallinity threshold, said crystallinity, at least at a region where a new track is deposited by the printhead on said previously deposited slice, and within a time range of 0-5 sec. after the new track is deposited, is controlled such that said crystallinity by default is going below said remaining crystallinity threshold and such that it selectively is maintained above said remaining crystallinity threshold, or said crystallinity, at least at a region where a new track is deposited by the printhead on said previously deposited slice, and within a time range of 0-5 sec. after the new track is deposited, is controlled such that said crystallinity is by default remains above said remaining crystallinity threshold and such that it selectively goes below said remaining crystallinity threshold, the crystallinity being controlled by at least one of the following:

controlling the build room temperature;

controlling the temperature of the nozzle of the printhead;

selectively and locally cooling or heating the object at said region where the next track is deposited.

It was found that during printing a 3D object, a change of crystallinity of the layer of the object (i.e. the substrate) on which a subsequent layer is deposited takes place over the course time. It was found that the specific range of the crystallinity of the substrate during printing has a significant influence on the strength and on the shape accuracy of the final object. The present invention is based on the new insight that different portions of a 3D printed object may have different physical requirements, such as strength and shape accuracy, and that therefore those different portions should be printed with different ranges in crystallinity in the substrate. There is a trade-off between the strength and the shape accuracy of the object portions. The crystallinity of the substrate can be controlled by controlling different process parameters in the extrusion based modelling method. The method according to the invention uses this by depositing layers of modelling material under conditions whereby the default is to make an object portion with a relatively high strength, and to switch to conditions whereby a relatively high shape accuracy, or vice versa.

In many parts the tracks at the perimeter of the part require a higher shape accuracy, such that they fit for example with other parts or objects, whereas tracks within the perimeter require to provide a higher strength, such that the part has sufficient strength to withstand loads. For the production of such parts, the present invention provides an advantageous method.

One of the process parameters that can be controlled is the temperature of the build room. The object adopts the temperature of the build room, and thus has an influence on the crystallinity of the modelling material of the substrate. The temperature of the build room is within a certain process range in which an object having sufficient strength and/or shape accuracy is achieved. When the build room temperature is selected near a lower limit of the temperature range, the shape accuracy or "aesthetic" quality will be higher. If a higher build room temperature is selected, a part with a higher tensile strength will be formed.

Another one of the process parameters that can be controlled is the temperature of the nozzle of the printhead. This nozzle temperature is above the melt temperature of the modelling material. The temperature of the hot melt that is deposited on previously deposited layers raises the temperature of the latter locally from the build room temperature to a temperature between the build room temperature and the nozzle temperature. This can be used to control the substrate temperature and the crystallinity of the substrate when a layer is deposited. A higher nozzle temperature will reduce the crystallinity of the substrate and will allow a strong fusion between the currently deposited track and the substrate. A lower nozzle temperature will lead to a higher crystallinity which leads to a less strong fusion, but which leads to a better shape retention of the substrate and thus a higher shape accuracy.

In view of the above, a method is conceivable in which two nozzles are used, one with a higher temperature and one with a lower temperature, wherein the "higher temperature" nozzle is used to print stronger portions of the object and the "lower temperature" nozzle is used to print more shape-accurate portions of the object.

Another option is to selectively and locally cool the object at said region where the next track is deposited. This can for instance be done by blowing a cooling gas locally at the location on the substrate where a track is deposited by the printhead or by radiating heat from a hot device. The cooling gas reduces the temperature locally and thereby raises the crystallinity of the substrate, which has a positive influence on the shape retention of the substrate, but which also leads to a less strong fusion between the newly deposited layer and the existing layer on which said new layer is deposited. Cooling thus leads to a part or body portion with a lower tensile strength.

Preferably the remaining crystallinity threshold is 10%, wherein the crystallinity is controlled such that it is lower than the threshold when a slice region of a body portion having a first tensile strength is deposited, and such that the crystallinity is higher than the remaining crystallinity threshold, when a slice region of a body portion is deposited having a second tensile strength, which is lower than the first tensile strength.

Thus, when a relatively strong part or body portion is to be manufactured, the crystallinity should be below the threshold of 10%. When a more shape accurate part or body portion is to be manufactured (e.g. a part fulfilling small dimensional tolerances) the crystallinity should be controlled to be above the threshold of 10%.

When the crystallinity controlled to be below the remaining crystallinity threshold, it is preferably less than 8%, more preferably less than 6%, more preferably less than 5%. It can be less than 4%, 3% or 2%.

When the crystallinity is controlled to be above the remaining crystallinity threshold, it is preferably between 10% and 20%.

With the method according to the invention objects can be made in which an object portion optimized for accuracy has at least 30% better shape accuracy than an object portion optimized for strength, wherein the shape accuracy is determined according to ISO 2768.

In a particular method according to the invention the modelling material is deposited within the build room having a temperature set to a build room temperature $(T_{br})$, at which the crystallinity of the modelling material at a location where at least three tracks of the previously deposited slice and the currently deposited slice meet, is less than 5%, when one of said at least three tracks is deposited by the printhead. Said crystallinity can also be less than 4%, or less than 3%, or less than 2%. The slice region temperature is controlled locally to a temperature $(T_{sr})$ by cooling the body at a region surrounding the location where the modelling material is deposited, at which temperature $(T_{sr})$ the crystallinity of the modelling material at a location where at least three tracks of the previously deposited slice and the currently deposited slice meet, the remaining crystallinity after deposition is more than 10% when one of said at least three, preferably four, tracks is deposited by the printhead. In this method a cooling gas blower can be used to control the crystallinity. In this method the default mode is to print strong object portions, and there is switched to a mode in which shape accurate object portions are printed.

In the above method the modelling material may be PEEK, wherein the build room temperature $(T_{br})$ ranges between 260° C. and 300° C., preferably is in a range 260° C. and 280° C., and the slice region temperature $(T_{sr})$ is controlled to a temperature in a range between 200° C. and 240° C., preferably between 210° C. and 230° C., more preferably to about 220° C.

In an alternative method according to the invention the modelling material is deposited within the build room having a temperature set to a build room temperature $(T_{br})$, at which the crystallinity of the modelling material at a location where at least three tracks meet, the crystallinity in said time range of 0-5 sec. after the new track is deposited is above the remaining crystallinity threshold, thus preferably more than 10%, when one of said at least three tracks is deposited by the printhead, and the slice region temperature is controlled locally to a temperature $(T_{sr})$ by heating the body at a region surrounding the location where the modelling material is deposited, at which temperature $(T_{sr})$ the crystallinity of the modelling material at a location where at least three tracks meet, is below the remaining crystallinity threshold, preferably is less than 5%, when one of said at least three tracks is deposited by the printhead. In this method a heating device, e.g. a heating gas blower, a heat radiating device or an increased nozzle temperature can be used to control the crystallinity. Also a combination of a heating device (gas blower or heat radiating device) and an increased nozzle temperature can be used to control the crystallinity.

In the following scheme the method options outlined in the above are summarized:

| Option | Substrate temperature | Default mode | Adaptation method |
|---|---|---|---|
| 1 | High | Strength | Cold extrudate |
| 2 | | | Local cooling |
| 3 | Low | Aesthetic | Hot extrudate |
| 4 | | | Local heating |

In options 1 and 2, the tracks are deposited by default in the "strength mode" at a relatively high substrate temperature, which results in an object or an object portion with a higher tensile strength. Within these methods can be toggled to an "aesthetic mode" by applying a relatively cool extrudate (option 1), or by local cooling by means of a cooling medium (option 2). In options 3 and 4, the tracks are deposited by default in the "aesthetic mode" at a relatively low substrate temperature, which results in an object or an object portion with a lower tensile strength, but with a better shape accuracy. Within these methods can be toggled to an "strength mode" by applying a relatively hot extrudate (option 3), or by local heating by means of a heating medium (option 4).

In a preferred method according to the invention a plurality of first tracks of three-dimensional modelling material is deposited by the printhead under a first pressure, wherein the first tracks are spaced apart so as to leave a gap between them; and a second track of three-dimensional modelling material is deposited by the printhead in each of the gaps between the deposited first tracks under a second pressure, which is higher than the first pressure, such that the gaps are filled entirely. In such a method voids between the adjacent tracks can be minimized which facilitates the manufacturing of stronger parts. In this method the notion is used that the modelling material at a location where at least three tracks, possibly four tracks, meet, goes through a crystallinity trajectory, wherein it reaches several times either a first state at which the crystallinity is less than the remaining crystallinity threshold, when one of said at least three, possibly four, tracks is deposited, and/or it reaches a second state at which the crystallinity is more than the remaining crystallinity threshold when one of said at least three, possibly four, tracks is deposited. If by printing the tracks in the gap (at a higher second pressure) the first state (at a higher temperature) is reached a strong part or body section can be made having a certain tensile strength. If the temperature only reaches the second state (at a lower temperature) a shape accurate part or body section can be made.

Another aspect of the invention relates to an extrusion based additive manufacturing apparatus comprising:

a build room adapted to be heated, a temperature control system to control a process temperature inside the build room, a build base located in the build room to support an object to be manufactured, a print head located in the build room for depositing (semi-) crystalline thermoplastic modelling material to build the object to be manufactured, the print head comprising a heating device to liquify the modelling material fed to the printhead in an initial solid state.

The print head and/or the base are coupled to a 3D positioning system to move the print head and/or the base relative to each other, allowing to deposit tracks of modelling material to build the object to be manufactured. The temperature control system has a "strength mode" and an "aesthetic mode" and is adapted to toggle between said "strength mode" and said "aesthetic mode" while manufacturing the object. The control system has a setpoint for the build room temperature which corresponds to the "strength mode", and the apparatus comprises a (precision) cooling device adapted to selectively and locally lower the temperature of the object to a temperature corresponding to the "aesthetic mode". Alternatively, the control system has a setpoint for the build room temperature which corresponds to the "aesthetic mode", and the apparatus comprises a (precision) heating device adapted to selectively and locally raise the temperature of the object to a temperature, which corresponds to the "strength mode".

In an embodiment of the apparatus, the setpoint for the build room temperature corresponding to the "strength mode" is selected for the specific modelling material such that when the crystallinity of the modelling material is determined at a location where at least three tracks meet, the crystallinity is less than a predefined remaining crystallinity threshold when one of said at least three tracks is deposited. Such a relatively "high" build room temperature assures that the substrate is hot enough such that, when a new track is deposited in a slice or layer, the crystallinity will surely sink below the remaining crystallinity threshold, whereby a good fusion between the new track and the adjacent tracks is achievable, which leads to a "strong" object or portion thereof.

In an embodiment of the apparatus, the setpoint for the build room temperature corresponding to the "aesthetic mode" is selected for the specific modelling material such that when the crystallinity of the modelling material is determined at a location where at least three tracks meet, the crystallinity is more than a predefined remaining crystallinity threshold when one of said at least three tracks is deposited. Such a relatively "low" build room temperature assures that the substrate has a low enough temperature such that, when a new track is deposited in a slice or layer, the crystallinity will surely remain above the remaining crystallinity threshold, whereby the object or portion thereof that is modelled is better allowed to remain stable in shape, which leads to a "aesthetic" better object or portion thereof.

In an embodiment of the apparatus may have two printheads, one operated with a higher temperature and one with a lower temperature, wherein the "higher temperature" printhead is used to print stronger portions of the object and the "lower temperature" printhead is used to print more shape-accurate portions of the object. In such an embodiment the cooling device or the heating device can be omitted. However, the apparatus can also combine the two printheads with a cooling and/or heating device.

Another aspect of the invention relates to a method for the additive manufacturing of an object of a (semi-) crystalline modelling material having a melting temperature $T_m$, wherein tracks of modelling material are deposited in slices by means of a printhead inside a build room at a extrudate temperature $T_{extr}$, wherein in each slice a plurality of tracks of the (semi-) crystalline thermoplastic modelling material is deposited by the printhead on a build base or on the tracks of a previously deposited slice. In this method:

the temperature of the build room ($T_{br}$) ranges between $(2*T_m-T_{extr}+14)$ and $(2*T_m-T_{extr}+54)$, wherein part of the tracks in a slice are printed in an aesthetic mode and part of the tracks are printed in a strength mode, wherein the temperature at a location where at least three tracks meet, in the aesthetic mode is controlled by local cooling and ranges between $(2*T_m-T_{extr}-56)$ and $(2*T_m-T_{extr}+4)$, wherein the temperature at a location where at least three tracks, preferably four tracks meet in the strength mode is controlled to be in the range $(2*T_m-T_{extr}+14)$ and $(2*T_m-T_{extr}+54)$.

The method is based on the notion that, in order to print strong products, the average of build room temperature $T_{br}$ and extrudate temperature $T_{extr}$ should be higher than the melt temperature $T_m$ of the modelling material, such that a crystallinity is achieved which provides a relative shape stability and an aesthetically good part can be made.

In a practical method the modelling material may be PEEK having a $T_m$ of 343° C., wherein $T_{extr}$ is 450° C. In such a method $T_{br}$ may range between 250° C. and 290° C., preferably between 270° C. and 280° C.

Another aspect of the invention relates to a method for determining a process temperature of a build room for additive manufacturing, in particular extrusion based modelling, wherein tracks of modelling material are deposited in slices by means of a printhead inside the build room, wherein in each slice a plurality of tracks of a (semi-) crystalline thermoplastic modelling material is deposited by the printhead on a build base or on the tracks of a previously deposited slice, wherein:

the crystallinity of the modelling material is determined at a location where at least three tracks of the previously deposited slice and the currently deposited slice meet, a first substrate temperature (T1) is determined at which the crystallinity is less than 5% when one of said at least three tracks is deposited, and/or.

a second substrate temperature (T2) is determined at which the crystallinity is more than 10% when one of said at least three tracks is deposited.

In the method the crystallinity may be measured using a MEMS-DSC device. MEMS stands for microelectromechanical system and DSC stands for differential scanning calorimetry.

In practice, melting behaviour of the modelling material is followed under a range of conditions using the MEMS-DSC device. In particular, a point of interest is selected, where at least three, possibly four tracks meet. Next, a temperature-time characteristic is determined for this point of interest by a simulation, using a given set of process conditions. Next, the temperature-time characteristic is used as input in the MEMS-DSC device whereby the crystallinity for this temperature time characteristic is measured. It is determined whether the crystallinity becomes lower than a predetermined remaining crystallinity threshold. Next the process conditions are adjusted and the previous steps (simulation to obtain temperature-time characteristic and measurement of crystallinity with MEMS-DSC) is repeated. Thus the process conditions to print "strong parts" are found by an iterative process. The obtained process conditions, inter alia the first substrate temperature (T1) are then used in the actual printing process. The second substrate temperature (T2) is lower than the first substrate temperature (T1) and is determined in an empirical way.

The first substrate temperature (T1) or the second substrate temperature (T2) determined by the method can be used in a method for manufacturing a three dimensional object by additive manufacturing (extrusion based modelling), wherein tracks of modelling material are deposited in slices by means of a printhead inside a heatable build room, said printhead being connected to a three dimensional positioning system, wherein in each slice a plurality of tracks of a (semi-) crystalline modelling material is deposited by the printhead on a build base or on the tracks of a previously deposited slice, whereby a body is formed by depositing the modelling material slice by slice. In particular, the setpoint for the build room temperature is selected to be the first substrate temperature (T1) or the second substrate temperature (T2). Depending on the selected substrate temperature (T1 or T2) to set the build room temperature, the process temperature is controlled locally to the second substrate temperature (T2) or the first substrate temperature (T1) by respectively cooling or heating the body at a region surrounding the location where the modelling material is deposited. If the first substrate temperature T1 is selected to be the build room temperature, the object manufactured in said build room will by default become a "strong part", i.e. it obtains a relatively high tensional strength, for example for PEEK>90 MPa. The tensional strength is determined with ISO527-2:2012, Specimen 1BA. One or more portions of the object may be provided with a lower strength (i.e. a lower tensile strength) by cooling locally the object at a region surrounding the location where the modelling material is deposited. However such a portion of the object, where the substrate is cooled locally and selectively, is provided with a higher remnant crystallinity at the location where the three or four tracks of modelling material are deposited just after the last of said at least three tracks is printed, which results in a better form stability of the portion created at said location which leads to an aesthetically better portion (i.e. a better "shape accurate" portion). The other way around, if the second substrate temperature T2 is selected to be the build room temperature, the object manufactured in said build room will by default become a "shape accurate part", i.e. it is for example aesthetically better formed (shape accuracy of sharp corners etc. as described in ISO2768), but it obtains a lower tensile strength, possibly 30% lower. By heating locally the object at a region surrounding the location where the modelling material is deposited, one or more portions of the object may be provided with a higher strength (i.e. a higher tensile strength) than the default. Such a portion of the object, where the substrate is heated locally and selectively, is provided with a lower crystallinity at the location where the modelling material is deposited by the printhead, which results in a stronger portion created at said location.

In a particular method according to the invention, wherein an object is manufactured from PEEK, the nozzle has a diameter of 0.6 mm, the track width is 0.72 mm and the track height is 0.15 mm, the object can have object portions having a shape inaccuracy less than 2 mm according to ISO2768.

BRIEF DESCRIPTION OF THE DRAWINGS

The invention will be further elucidated in the following detailed description with reference to the drawings, in which:

FIG. 15 shows a table of seven samples printed according to the shape of FIG. 14A to 14C, under different conditions.

FIGS. 17A and 17B is shown an overhang printed object in a view in perspective and a top elevational view, respectively, FIG. 18A shows a table with sample data and conditions under which the samples are printed according to FIGS. 17A and 17B, and FIG. 18B shows the surface roughness according to ISO 21920 of the three samples of the table of FIG. 18A.

DETAILED DESCRIPTION OF THE INVENTION

Figure 1:
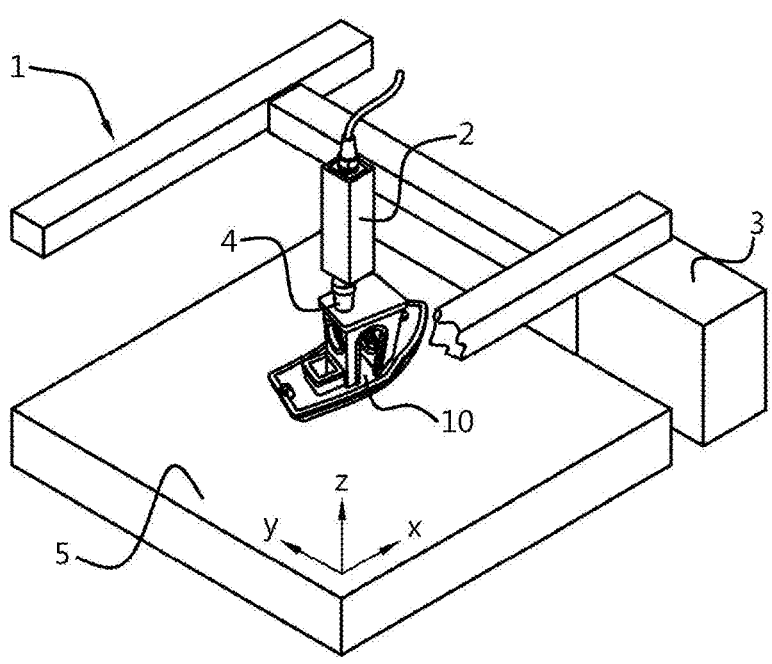
FIG. 1 illustrates schematically a 3D printer of an extrusion based additive manufacturing apparatus.

In an additive manufacturing process objects are formed by layering modelling material such that a desired three-dimensional (3D) shaped object is created. A practical way to form the 3D object is Fused Deposition Modelling (FDM) by means of a 3D printer. FIG. 1 shows an example of a 3D printer 1 which prints an object 10. The 3D printer 1 comprises a moveable printhead 2, which is connected to a three dimensional positioning system 3. The printhead 2 melts the initially solid modelling material and has a nozzle 4 from which the melted modelling material is extruded and is deposited in tracks by relatively moving the printhead and a build base 5 on which the object 10 is built. The first layer is deposited on the build plate 5. When a layer, comprising deposited tracks, is finished, the printhead 2 is moved to deposit a next layer comprising tracks of depositing material on top of the previously deposited layer.

As a modelling material used in the FDM process a crystalline or semi-crystalline polymer is used. An example of a suitable semi-crystalline polymer is PEEK. The thermoplastic polymer composition comprises at least 80 wt. % of a PEEK, preferably at least 90 wt. % of a PEEK, more preferably 100 wt % PEEK. Other examples of suitable (semi-) crystalline polymers or polymer compositions are polyethylene (PE), polypropylene (PP), polyphenylene sulfide (PPS), polyphthalamide (PPA), thermoplastic polyimide (TPI), polyamide (PA) and polyarylether ketones (PAEK) like for example polyether ketone (PEK), polyether ketone ketone (PEKK), polyether ether ketone ketone (PEEKK) and polyether ether ketone ether ketone ketone (PEEKEKK) and combinations thereof, wherein, preferably, the thermoplastic polymer composition comprises at least 80 wt. % of a PAEK, preferably at least 90 wt. % of a PAEK.

Figure 2:
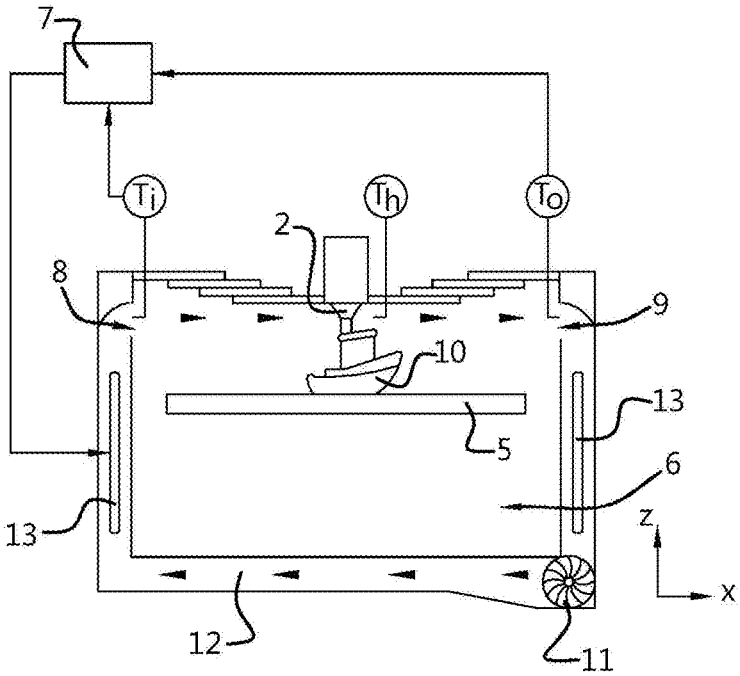
FIG. 2 shows schematically a build room of an extrusion based additive manufacturing apparatus according to the invention.

The printhead 2 and the build base 5 are inside a heatable build room 6, as is illustrated in FIG. 2. The build room 6 is a sort of oven which is kept on a certain temperature, the so called build room temperature to enhance the fusion of adjacent tracks of modelling material during printing of the object 10.

A pattern of tracks is designed by means of dedicated software. The software, which runs on a computer, allows to virtually divide a designed 3D object 10 in slices, wherein in each slice a pattern of tracks is determined by the software. This process is therefore referred to as "slicing". The pattern of tracks in each slice is used in instructions for the positioning system 3 to move the printhead 2 and depositing the tracks of modelling material in each layer of the printed object. In the following the terms "slice" and "layer" may be used interchangeably.

Tracks of modelling material are thus deposited in slices by means of a printhead 2 inside a heatable build room 6 according to a predetermined pattern. The fusion of adjacent tracks, i.e. tracks next to each other in the same slice and tracks touching each other in different slices, determines ultimately the mechanical strength of the object 10 or a section of the object 10. In particular, the tensile strength in the Z-direction is a parameter used to indicate the mechanical strength of the object. The fusion of adjacent tracks depends on the thermal behaviour of the 3D printing process. Also, the accuracy of the shape of the object, or portions of the object depends on the thermal profile of the printing process. One will understand that the modelling material is brought in the printhead to a temperature above the melt temperature of the particular (semi-) crystalline polymer material used. The build room temperature $T_{br}$ is necessarily lower than the melt temperature $T_m$ of the modelling material, such that the portion of the object 10 that is already built maintains its shape. For example PEEK has a melt temperature of about 343° C., which is extruded from the nozzle at a temperature which is above 400° C. and the build room temperature $T_{br}$ is set to a temperature below 300° C.

In practice, one is confronted with a trade-off between the mechanical strength of the object (e.g. tensile strength in Z-direction) and on the accuracy of the shape of the object, or portions of the object since a higher process temperature is beneficial for strength and a lower process temperature is beneficial for shape accuracy which may inter alia result in better aesthetics of the object.

The thermal behaviour of the printing process depends inter alia on conduction of heat between tracks and layers and to the build base 5, convection of heat from and to the environment (i.e. the build room), radiation from the printing nozzle 2 and the time that has passed since a previous track was deposited nearby or the nozzle was previously near the same location.

To create a temperature profile as a function of time, a thermal analysis needs to be done. Because it is not possible to accurately measure the temperature profile in an object 10 on every point that could be interesting, a simulation is executed. The simulation mimics the thermal behavior of the 3D printing process and includes:

conduction between tracks and layers and to the build base;

convection from and to the environment;

radiation from the printing nozzle.

The nozzle radiation may also influence the temperature in the point of interest when printing tracks of different parts of the object which are located in the vicinity of the point of interest.

A method to get to the thermal analysis comprises the following steps:

1. Create a 3D Model of the Object to be Printed

The 3D model of the object to be printed can be created for example in a CAD system.

2. Slice the 3D Model

Slicing the 3D model is done by a computer program, which contains algorithm that computes the path of the tracks to be printed by the printhead layer by layer (or slice by slice), as is also mentioned in the above.

3. Designate a Point in the 3D Model for which it is Desired to Know if the Thermal Conditions are Optimal This can for instance be a point at a location where the highest tensile stress is expected.

4. Create a Thermal Finite Element (FE) Model of the Given 3D Object

Create a Finite Element model of the object by loading the sliced geometry into a FE program (e.g. ANSYS) and by meshing the object. In doing this, the following is to be kept in mind:

The FE model that is defined should contain all phenomena that influence the analysis. For the object that is meshed this means for example that the geometry taken into account should be large to avoid boundary effects (e.g. printing height at sufficient distance from the build plate)

The size and location of the elements of the FE model near the point of interest should accurately reflect the print path. The element size should be defined in such a manner that for the given print speed the element shape functions are able to describe the temperature gradients that arise in the object as a function of time and location with sufficient accuracy.

Create the material model by determining and defining the material properties relevant for the thermal analysis. The melting behavior of the modelling material is determined under a range of conditions using a MEMS-DSC device. In particular, dynamic crystallisation processes are explored over a range of temperatures. The relevant model properties are thermal conductivity, specific heat capacity, density, coefficient of heat convection, and emissivity.

Figure 3:
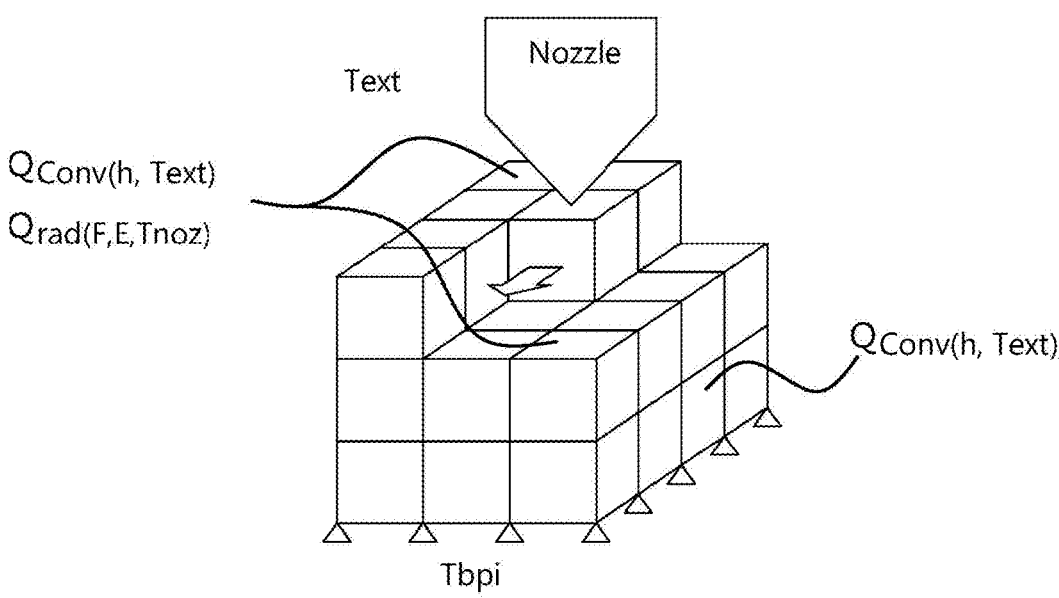
FIG. 3 illustrates the elements of a 3D model in a thermal finite element analysis.

Define the boundary conditions for the model. These should at least describe following phenomena (see FIG. 3):

Heat transfer to build base

Convection to buildroom gas ($T_{ext}$)

Radiation of the nozzle to the object (see next step).

Define the analysis that describes the printing process. Use the information of the print paths as a function of time, as was determined while slicing the model, to define the print order. This can be done in the following manner:

Deactivate all elements that will be printed during the analysis. Note that there should be no heat transfer (through conduction, convection or radiation) from the active elements to the deactivated elements or vice versa.

During each step of the analysis activate the element(s) that are printed during this timestep. Note that the size of the time step during the printing analysis is defined by the element size and the print speed, as during each step in the printing direction only one element is activated.

The temperatures at the interface between the newly activated element and the other active elements take into account the temperatures of the surrounding active elements. Therefore, there will be a discrepancy in the heat balance. This should be corrected by applying a heat flux to the newly activated element.

Heat is radiated from the nozzle to the surrounding geometry. This should be modelled by radiation, taking into account the appropriate view factor between nozzle and object/element surface. Due to the nozzle movement the view factors should be updated every step.

The quality of the FE analysis should be checked by following validations:

Parametric analyses using finer meshes, showing that the mesh density will not affect the outcome of the analysis. Note that this also effects the time step.

Validation that the heat balance (amount of energy added to the FE analysis) of the activated elements is correct.

5. Validate if the FE Model is Accurate Enough

The following checks should be performed to validate the calculated temperature profile. These checks should be repeated for every significant change in the simulation model (large temperature change, different material etc.).

Figure 4:
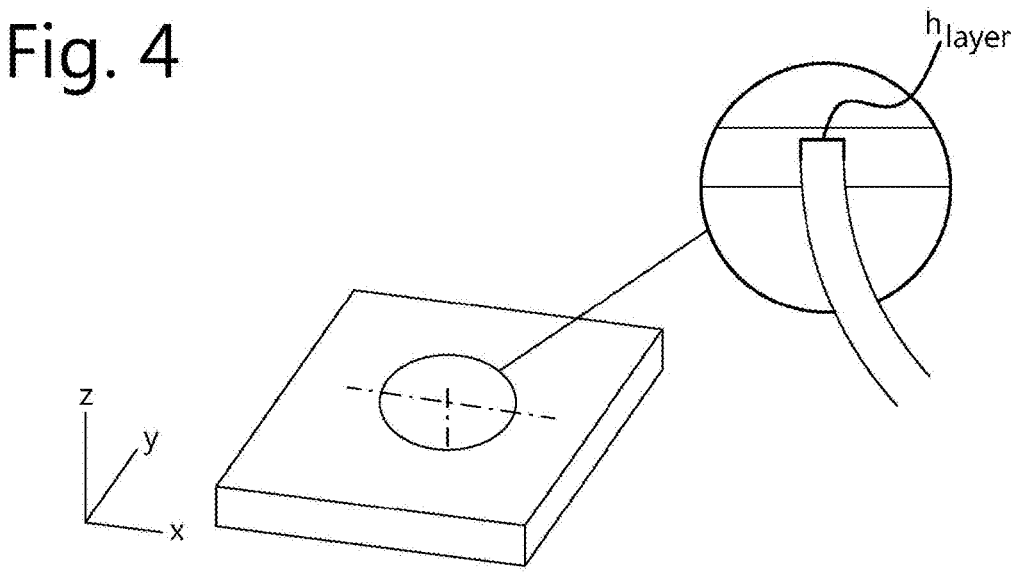
FIG. 4 shows how a thermocouple is to be placed in a plate for a radiation test to determine whether the nozzle radiation is applied correctly in a simulation with the finite element model.

Radiation Test (See FIG. 4):

To test whether the nozzle radiation is applied correctly in the simulation a test needs to be done.

Use a type K thermocouple suitable for the temperatures of the printing process of the chosen material. The accuracy of the thermocouple should at least be within 5° C. The diameter of the thermocouple should be 0.5 mm or less. Be aware that the thermocouple should be used as prescribed.

Drill a hole in a plate of the printed modelling material from the bottom up to one layer height from the surface.

The hole should be as small as possible to fit the thermocouple in the hole.

Use thermo pasta to attach the thermocouple in the plate.

Place the plate in the printer and wait until the steady state temperature has been reached.

Move with a heated nozzle and the chosen print speed in X-direction over the thermocouple.

The Y-coordinate should be equal to the Y-coordinate of the thermocouple.

The Z-coordinate should be one layer height above the surface of the plate.

Repeat the test for different Y-coordinates until no more influence is measured.

Create a FE simulation representing the test and compare the simulation results with the measurements. If the FE model is a good representation of the test and the radiation has been modelled correctly there is a good correspondence between simulation and tests.

Testing the Cooling Rate:

Use the plate from the previous test with the thermocouple still in place.

Place the plate in the printer and wait until the steady state temperature has been reached.

Print a single line (in X-direction) over the thermocouple.

Create a FE model representing the test. This model has the same material properties and boundary conditions as the FE model for the printing simulation.

Compare the cooling curve of the thermocouple and the simulation results. There should be a good correspondence between simulation and the tests.

6. Perform the Analysis

After model validation and verification perform the analysis of the printing process. Determine the temperature profile as a function of time for the point of interest. For example in FIG. 5 the thermal profile of point 3 is plotted.

7. Determine the Crystallinity

Figure 6A:
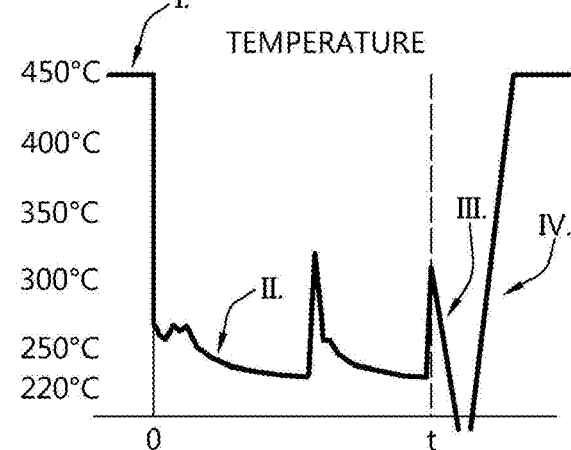
FIG. 6A shows an example of a simulated thermal profile.
Figure 6B:
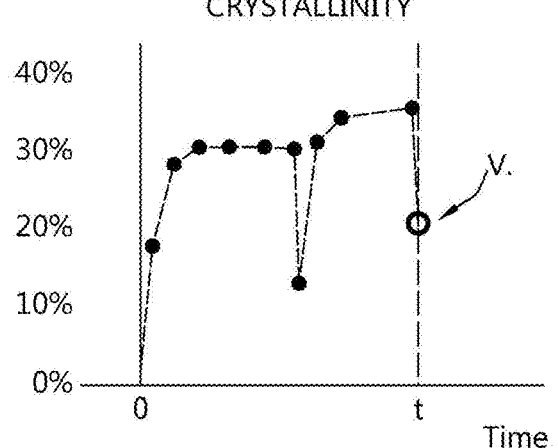
FIG. 6B shows the measured crystallinity based on the thermal profile of FIG. 6A.
Figure 9:
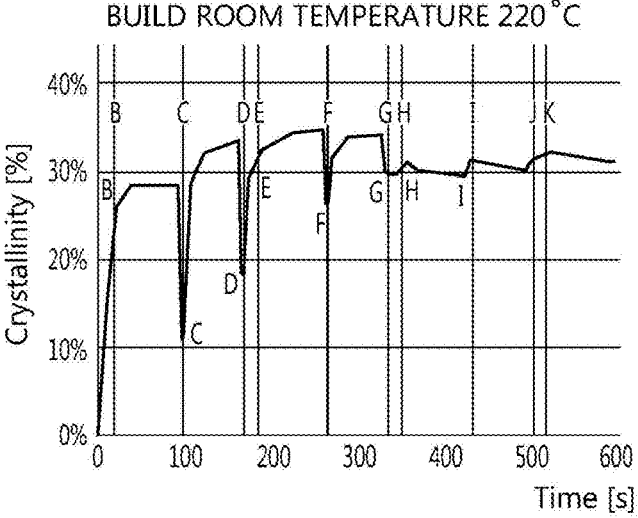
FIG. 9 shows a predicted crystallinity at the point of interest associated with the thermal profile in FIG. 8.
Figure 13:
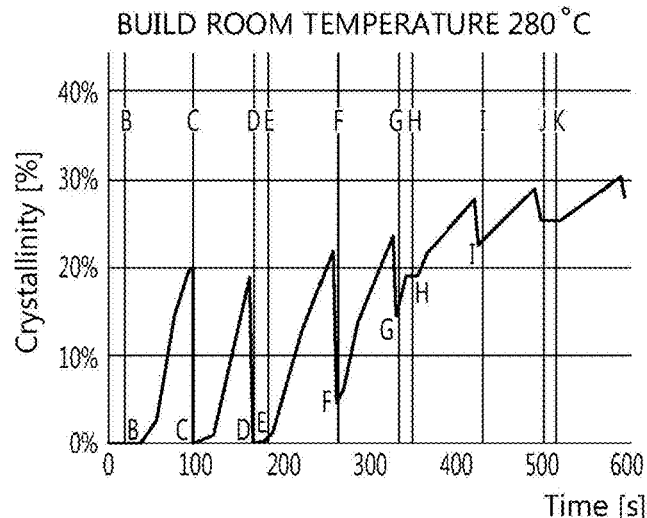
FIG. 13 shows a predicted crystallinity at the point of interest associated with the thermal profile in FIG. 12, FIG. 14A to 14C show the shape and dimensions of a sample to be printed to determine the shape accuracy of the sample, FIG. 14D indicates a detail A of the shape shown in FIGS. 14A to 14C.

In the MEMS-DSC device, a very small sample (e.g. 260 ng) of printing material is deposited, according to the instructions of the device. A MEMS-DSC device, such as the Mettler Toledo DSC 3 (Mettler Toledo, UK), is capable of heating and cooling the sample with heating rates up to 50.000 K/s and cooling rates up to 4.000 K/s, while accurately recording the amount of energy needed to change the temperature (see also FIGS. 6A and 6B in which the numbers I to V are indicated):

a. The specimen is kept at $T_{extr}$ for a short amount of time (I).

b. The thermal profile determined with the thermal FE model in step 6 is executed on the MEMS-DSC device (II).

c. At a predetermined point in time 't', the execution is aborted, and the sample is cooled down to 30° C. with a cooling rate of 4000 K/s (III), thus accurately maintaining the crystalline state of the sample at time 't'.

d. The temperature is increased to $T_{extr}$ again at a heating rate of 1000 K/s (IV), while recording the energy required to melt the sample, to determine the amount of crystallinity of the sample e. Steps a to d are repeated for as many values of time 't' as are required, thus reconstructing the change in crystallinity for the full time sequence (FIG. 9 and FIG. 13). In particular, the crystalline fraction at times just after depositing additional material near the point of interest are interesting for evaluation.

Figure 5:
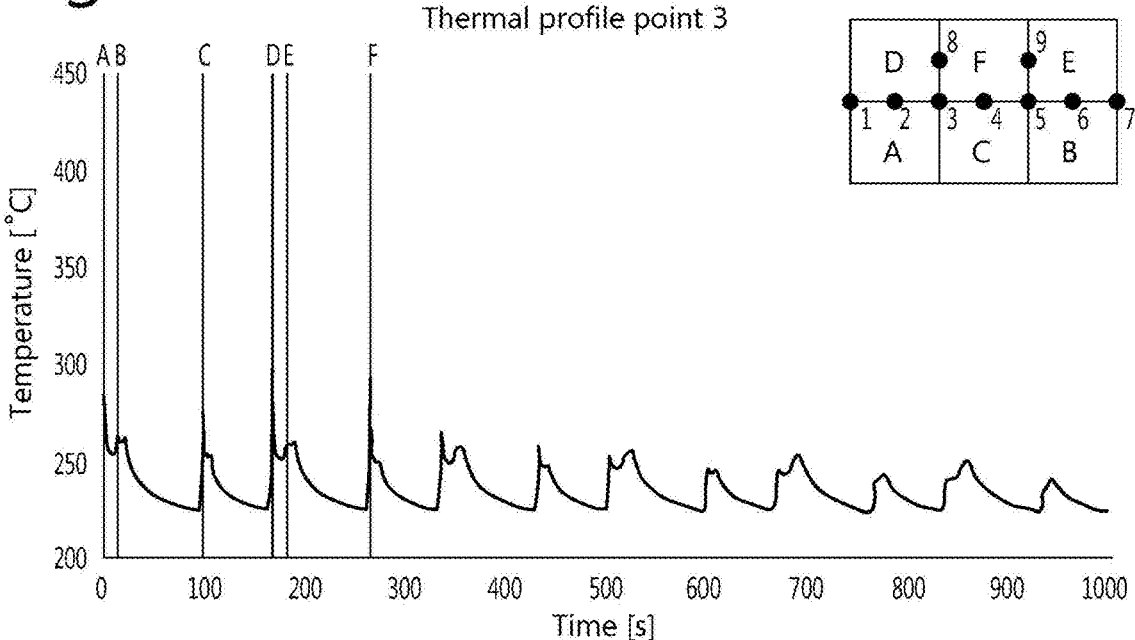
FIG. 5 shows a simulated thermal profile at a point of interest in the finite element model.

It is to be noted that the sequence of "printing" the elements is A-B-C-D-E-F, which also follows from FIG. 5. For generic objects, the tracks in subsequent layers are often not printed on top of each other or parallel to the tracks in the underlying layer. The simulated sequence corresponds to a printing sequence wherein a plurality of first tracks of three-dimensional modelling material is deposited by the printhead under a first pressure, wherein the first tracks are spaced apart so as to leave a gap between them; and a second track of three-dimensional modelling material is deposited by the printhead in each of the gaps between the deposited first tracks under a second pressure, which is higher than the first pressure, such that the gaps are filled entirely. Such a printing method is subject of a co-pending patent application of the applicant.

Figure 7A:
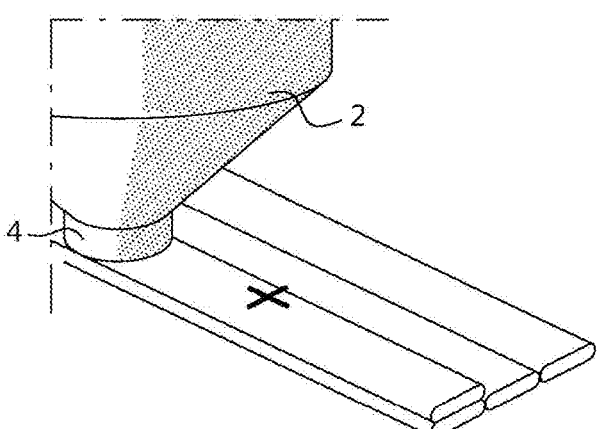
FIGS. 7A and 7B shows the location of the point of interest during actual printing of a track D of the object.
Figure 7B:
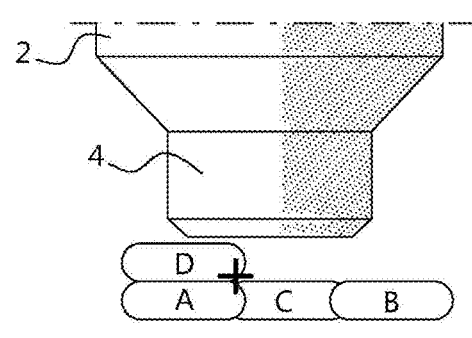
Figure 8:
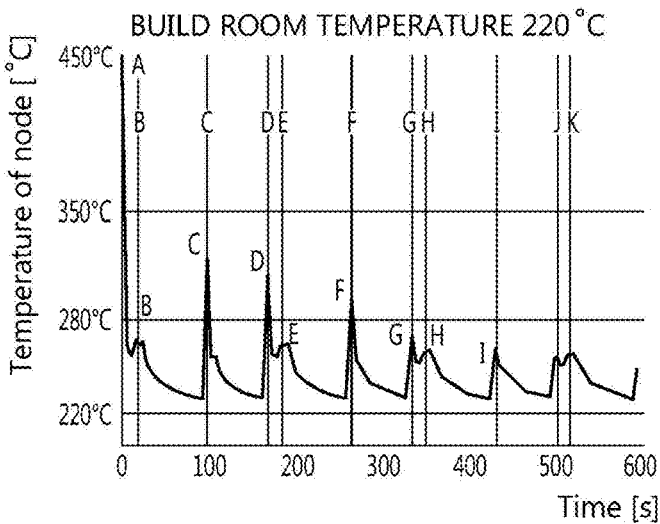
FIG. 8 shows a part of the simulated thermal profile at the point of interest corresponding to the print status shown in FIGS. 6 and 7.

In FIGS. 7A and 7B is shown that track D is printed by the printhead 2 having nozzle 4. The point of interest is indicated by a "+" in the figures and is where the tracks A, C and D meet each other. In FIG. 8 is illustrated how the simulated temperature develops over time at the point of interest, wherein the build room temperature is set to 220° C. This is thus comparable to the thermal profile at point 3 shown in FIG. 5. In FIG. 9 is shown the measured crystallinity over time at the point of interest. FIG. 9 shows that when track A is printed, the crystallinity is 0%, which is logical, because it is the melted extrudate, when track B is printed the crystallinity increases at the point of interest to about 28%, next when track C is printed the crystallinity at the point of interest is reduced again to about 10%, when track D is printed the crystallinity at the point of interest only reaches about 20%.

Figure 10:
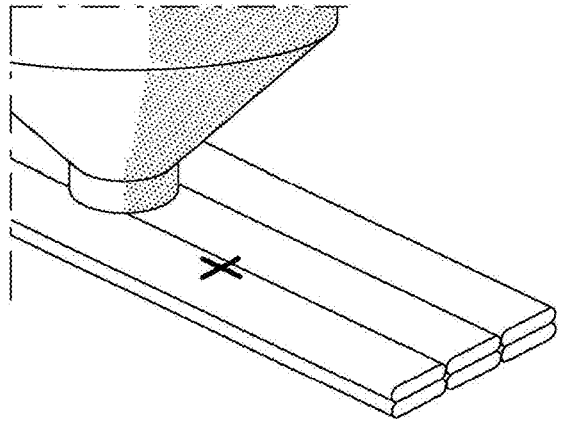
FIGS. 10 and 11 shows the location of the point of interest during actual printing of a track F of the object.
Figure 11:
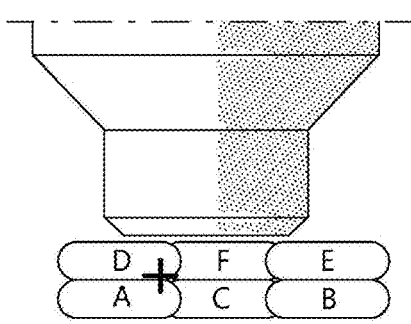

In FIGS. 10 and 11 is shown how track F is printed by the printhead 2 having nozzle 4.

Figure 12:
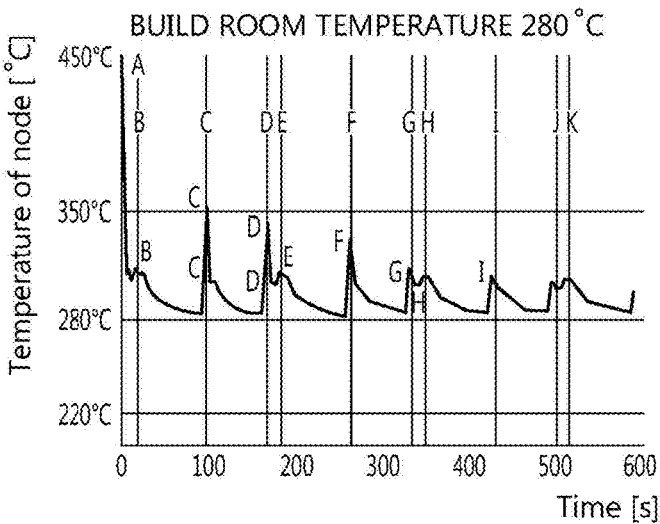
FIG. 12 shows a thermal profile of the simulated thermal profile a build room temperature at the point of interest corresponding to the print status shown in FIGS. 10 and 11.

In FIG. 12 is shown how the simulated temperature develops over time at the point of interest, wherein the build room temperature is set to 280° C. In FIG. 13 is shown the measured crystallinity over time at the point of interest, corresponding to the simulated thermal profile shown in FIG. 12. The plot in FIG. 13 shows the crystallinity at build room temperature of 280° C. What this simulation indicates is that at a build room temperature of 280° C., the crystallinity at the point of interest reduces to 0% or just above when the tracks A, C and D are printed, and also when track F is printed the crystallinity is reduced to less than 5%. What this simulation thus indicates is that for this particular modelling material, a build room temperature of 280° C. will almost entirely remelt the material at the point of interest when the tracks C and D are printed. This will lead to a strong fusion between the tracks A, C and D. Also a low crystallisation of less than 5% when track F is printed warrants a strong bond at the point of interest with track F.

With such a simulation a process temperature of a build room can be determined for additive manufacturing, in particular extrusion based modelling, wherein tracks of modelling material are deposited in slices by means of a printhead inside the build room, wherein in each slice a plurality of tracks of a (semi-) crystalline thermoplastic modelling material is deposited by the printhead on a build base or on the tracks of a previously deposited slice. With the simulation and measurements the crystallinity of the modelling material is determined at a location where at least three tracks, preferably four tracks, meet. A first substrate temperature T1 is determined at which the crystallinity is less than 5% when one of said at least three, preferably four, tracks is deposited, and/or a second substrate temperature T2 is determined at which the crystallinity is more than 10% when one of said at least three, preferably four, tracks is deposited. In the above example the first substrate temperature T1=280° C. and the second substrate temperature T2=220° C., which corresponds to the respective build room temperatures.

The person skilled in the art will appreciate that this insight allows to evaluate various combinations of process settings for multiple sliced objects, for instance also objects where the tracks are not printed exactly onto of the tracks in previous layers, or sections which are printed at different print speed, or for parts where the time it takes for the nozzle to return to the same location is longer or short. Through thorough analysis of worst-case situations, process conditions can be found that produce strong parts for generic situations.

The first substrate temperature T1 or the second substrate temperature T2 determined by the method using the simulation can be used in a method for actual manufacturing a three dimensional object 10 by 3D printing, wherein tracks of modelling material are deposited in slices by means of the printhead 2 inside the heatable build room 6, wherein in each slice a plurality of tracks of a (semi-) crystalline modelling material is deposited by the printhead 2 on the build base 5 or on the tracks of a previously deposited slice. In particular, the setpoint for the build room temperature is selected to be the first substrate temperature T1 or the second substrate temperature T2.

If the build room temperature is selected to be the first substrate temperature T1, the object manufactured in said build room will by default become a "strong part", i.e. it obtains a relatively high mechanical strength, for example for PEEK a tensile strength higher than 90 MPa is achievable. However, it may be desired to print an object which has strong sections and sections which have a more accurate form. For example, it is conceivable that an object is printed which has an internal core portion which has a high mechanical strength, and which has an outer portion, or skin portion, which needs to have an accurately formed shape such that it fits for example in a complementary device, or for example fits in a cavity in a human body (e.g. a spinal cage).

According to the invention a part having at least a strong portion and at least a shape accurate portion can be printed by setting the build room to the first substrate temperature T1, and by cooling the object locally at a region surrounding the location where the modelling material is deposited by the printhead 2. Such a portion of the object, where the substrate is cooled locally and selectively, is provided with a higher crystallinity at the location where the modelling material is deposited, which results in a better form stability of the portion created at said location which leads to an aesthetically better portion or a more shape accurate portion. This shape accurate portion has a lower strength. By combining strong portions with shape accurate portions, monolithic objects can be 3D printed which fulfil both the strength requirements and dimensional tolerance which may be needed in some applications.

The other way around, the build room temperature can also be selected to be the second substrate temperature T2. The object manufactured in said build room will in that case by default become a "form accurate part", i.e. it fulfils lower dimensional tolerances and is for example aesthetically better formed (e.g. better sharp edges etc.), but it obtains a lower tensional strength. By heating locally the object at a region surrounding the location where the modelling material is deposited, one or more portions of the object may be provided with a higher strength (i.e. a higher tensile strength) than the default. Such a portion of the object, where the substrate is heated locally and selectively, is provided with a lower crystallinity at the location where the modelling material is deposited by the printhead, which results in a stronger portion created at said location.

In FIG. 2 the build room 6 is shown, which is adapted to be heated. The build room 6 has a heated air circulation system which has an air flow inlet 8 and an air flow outlet 9. The air flow moves from the inlet 8 to outlet 9 as is illustrated by the arrows at the top side of the build room 6. The air is recirculated from the outlet 9 to the inlet 8 by means of a ventilator 11 or the like, which is arranged in a recirculation passage 12. In the recirculation passage 12 one or more heating devices 13 are arranged to reheat the air conducted towards the air flow inlet 8. A temperature control system 7 is arranged to control a process temperature inside the build room 6. The control system 7 is connected to temperature sensors $T_i$ and $T_o$ arranged at the air inlet 8 and air outlet 9 of the build room 6, and is connected to the one or more heating devices 13.

The temperature control system 7 has a "strength mode" and an "aesthetic mode" and is adapted to toggle between said "strength mode" and said "aesthetic mode" while manufacturing the object.

The temperature control system 7 is provided with a setpoint for the build room temperature which corresponds to the "strength mode" (the first substrate temperature T1 determined in the above), and the apparatus comprises a cooling device adapted to selectively and locally lower the temperature of the object to a temperature corresponding to the "aesthetic mode".

The setpoint for the build room temperature corresponding to the "strength mode" may for example be selected for the specific modelling material such that when the crystallinity of the modelling material is determined by the simulation at a location where at least three tracks, preferably four tracks, meet, the crystallinity is less than a predetermined remaining crystallinity threshold when one of said at least three, preferably four, tracks is deposited.

Another option is that the temperature control system has a setpoint for the build room temperature which corresponds to the "aesthetic mode" (the second substrate temperature T2 determined in the above), and the apparatus comprises a heating device adapted to selectively and locally raise the temperature of the object to a temperature, which corresponds to the "strength mode". The setpoint for the build room temperature corresponding to the "aesthetic mode" may for example be selected for the specific modelling material such that when the crystallinity of the modelling material is determined by the simulation at a location where at least three tracks, preferably four tracks, meet, the crystallinity is above a predetermined remaining crystallinity threshold, e.g. more than 10% when one of said at least three, preferably four, tracks is deposited The print head comprises a heating device to liquify the modelling material fed to the printhead in an initial solid state.

In the above embodiment the toggling between the "strength mode" and the "aesthetic mode" is done by switching on a cooling device or a heating device which for example blows a cooling gas or heating gas on a region of the object 10. In another embodiment of the extrusion based additive manufacturing apparatus the apparatus has a plurality of printheads 2 which are moveable through the build room 6. It is conceivable to set the temperature of the printheads differently. Thus, for example, when the apparatus has two printheads, one printhead can print with a high extrudate temperature $T_{extr1}$ and the other printhead can print with a lower extrudate temperature $T_{extr2}$. The extrudate temperature $T_{extr}$ has influence on the remelting of the previously deposited tracks and thus on the crystallinity of these tracks. This can advantageously be used in toggling between a "strength mode" and an "aesthetic mode". By printing selectively with different printheads 2 having different extrudate temperatures the system can toggle between "strength mode" and "aesthetic mode".

Another option is to use the print speed as a control parameter to influence the thermal profile, and thus the crystallinity of the previously printed tracks. Within a certain range the printing speed can be varied, which has an influence on the heat conduction and heat convection from the printhead and the extrudate to the previously printed tracks. Variation of the print speed can advantageously be used in a control system 3 to toggle between a "strength mode" and an "aesthetic mode".

The shape accuracy (or reasoned the other way around, the shape inaccuracy), and thus the aesthetic quality of the printed object or a portion of the printed object can be determined with ISO 2768.

Figure 14A:
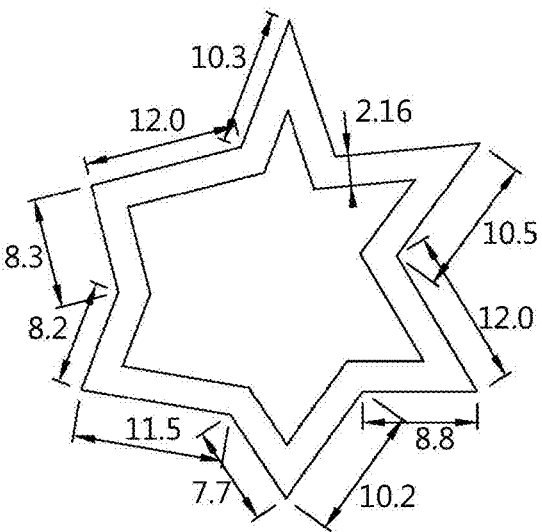
FIG. 14E shows the detail A of FIG. 14D.
Figure 14B:
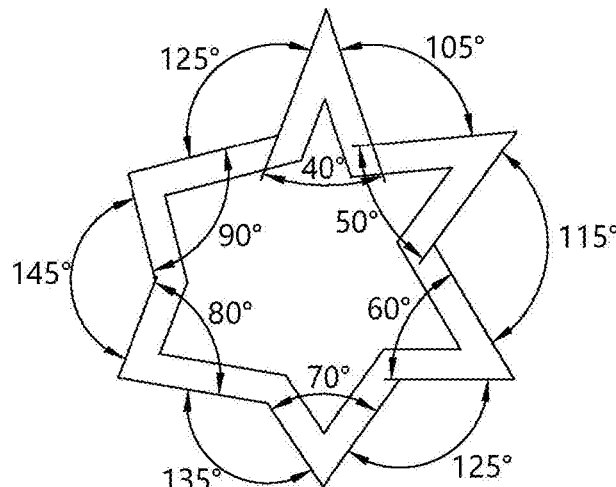
Figure 14C:
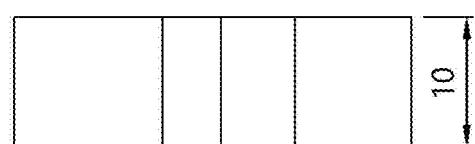

An example of a sample that can be printed is shown in FIGS. 14A, 14B and 14C. The sample is a 6-pointed star as depicted in the figures.

The 6-pointed star has:
sharp outer angles between 40° and 90°;
shallow outer angles between 105° and 145°;
outer edges between 7.5 and 12 mm long;
profile width of 2.16 mm;
height of 10 mm;
The samples are printed
with Victrex PEEK 450 G as material;
with nozzle having a diameter of 0.6 mm;
three tracks wide, with a track width of 0.72 mm
with a layer height of 0.15 mm.
Seven samples were printed at different thermal conditions, varying form "strongest" to "most shape accurate".

In FIG. 15 is shown a scheme where the seven samples having a 6-point star are shown. The samples have a number in the column indicated by "Print job #". In the next three columns the Extrudate temperature ($T_{extr}$) The build room temperature ($T_{br}$) and the temperature of the conditioner ($T_{con}$) are shown for the respective sample. The conditioner is in this example a cooling device blowing a cooling gas having a temperature $T_{con}$. A picture of each printed sample is shown in the right halve of the scheme.

Figure 14D:
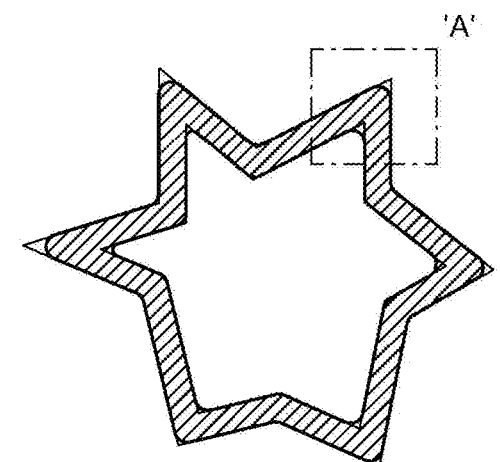
Figure 14E:
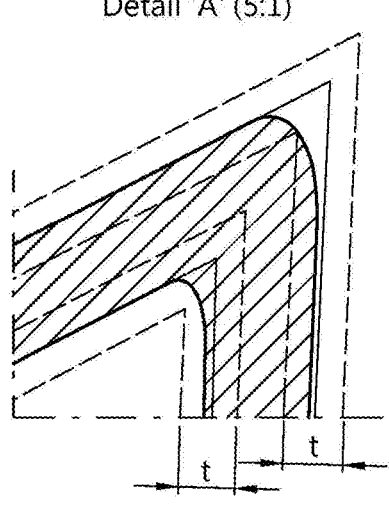

From these samples the shape inaccuracy is determined according to ISO 2768. In FIG. 14D and FIG. 14E is illustrated how the shape inaccuracy t is measured according to this norm. The results are plotted and shown in FIG. 16, wherein on the horizontal axis the sample ID's are plotted, and on the vertical axis the shape inaccuracy [mm] according to ISO 2768.

Figure 16:
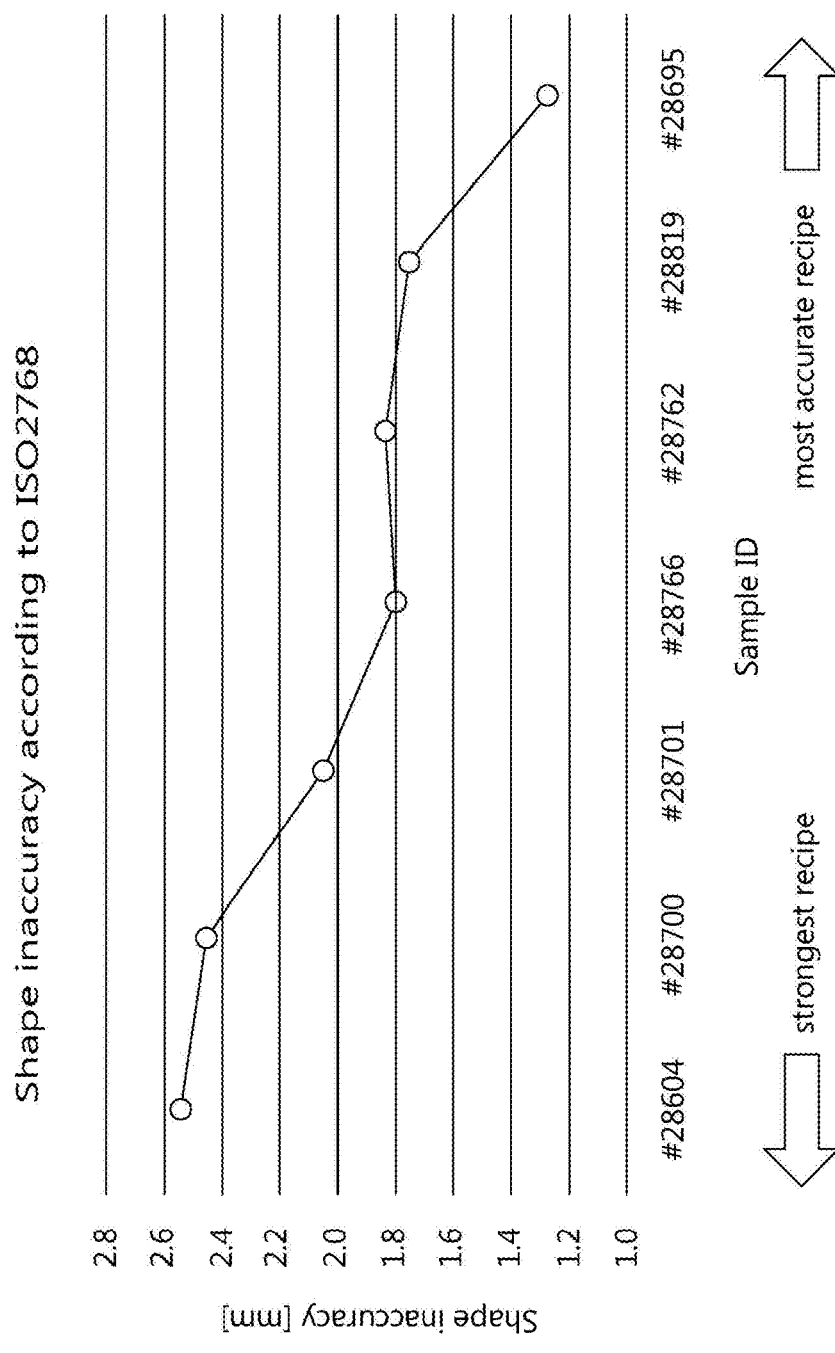
FIG. 16 shows a plot of the shape inaccuracy determined according to ISO 2768 for the samples of the scheme of FIG. 15.

FIGS. 15 and 16 demonstrates that by selecting the build room temperature, the extrudate temperature and the conditioner temperature, the shape accuracy of the object or a part of the object, can be selectively changed. For example, a comparison between the samples 28766 and 28695 which are printed at the same extrudate temperature and with the same build room temperature, shows that by selectively cooling by means of the conditioner the shape inaccuracy can be decreased with about 30%.

Another measure for the aesthetic quality is the surface roughness Ra [μm] which can be determined according to ISO 21920. In FIGS. 17A and 17B is shown an overhang printed object. The surface roughness is determined at the outside of the side wall indicated by the arrow (1). This object is printed under three different conditions, which is indicated in the scheme in FIG. 18A. The surface roughness of the three samples is shown in FIG. 18B. From this one can derive that by selectively cooling while printing, a sample with a substantially lower surface roughness can be obtained.

It is noted that in the above the invention is illustrated by non-limiting examples. Modification of the conditions, materials and equipment in the examples shown is envisaged whilst still being within the scope of the claimed invention.

What is claimed is:

1. A method for manufacturing a three dimensional object by additive manufacturing, wherein tracks of modelling material are deposited in slices by means of a printhead inside a heatable build room, said printhead being connected to a three dimensional positioning system, wherein in each slice a plurality of tracks of a crystalline or semi-crystalline modelling material is deposited through a nozzle of the printhead on a build base or on the tracks of a previously deposited slice, whereby a body is formed by depositing the modelling material slice by slice, wherein: the crystallinity (%) of the modelling material of said previously deposited slice is above a remaining crystallinity threshold, said crystallinity, at least at a region where a new track is deposited by the printhead on said previously deposited slice, and within a time range of 0-5 sec. after the new track is deposited, is controlled such that said crystallinity by default is going below said remaining crystallinity threshold and such that it selectively is maintained above said remaining crystallinity threshold, or said crystallinity, at least at a region where a new track is deposited by the printhead on said previously deposited slice, and within a time range of 0-5 sec. after the new track is deposited, is controlled such that said crystallinity by default remains above said remaining crystallinity threshold and such that it selectively goes below said remaining crystallinity threshold, the crystallinity being controlled by at least one of the following:

controlling the build room temperature;

controlling the temperature of the nozzle of the printhead;

selectively and locally cooling or heating the object at said region where the next track is deposited.

2. The method according to claim 1, wherein said remaining crystallinity threshold is 10% and wherein the crystallinity is controlled such that it is lower than the threshold, optionally less than 8%, less than 6%, less than 5%, less than 4%, less than 3%, or less than 2% when a slice region of a body portion having a first tensile strength is deposited, and such that the crystallinity is higher than the remaining crystallinity threshold, optionally between 10% and 20%, when a slice region of a body portion is deposited having a second tensile strength, which is lower than the first tensile strength.

3. The method according to claim 1, wherein:

the modelling material is deposited within the build room having a temperature set to a build room temperature ($T_{br}$), at which the crystallinity of the modelling material at a location where at least three tracks of the previously deposited slice and the currently deposited slice meet, the remaining crystallinity is less than 5% when one of said at least three tracks is deposited by the printhead, and the slice region temperature is controlled locally to a temperature ($T_{sr}$) by cooling the body at a region surrounding the location where the modelling material is deposited, at which temperature ($T_{sr}$) the crystallinity of the modelling material at a location where at least three tracks, optionally four tracks, of the previously deposited slice and the currently deposited slice meet, the remaining crystallinity is more than 10% when one of said at least three, optionally four, tracks is deposited by the printhead.

4. The method according to claim 3, wherein the modelling material is PEEK and wherein the build room temperature ($T_{br}$) ranges between 260° C. and 300° C., optionally is in a range between 260° C. and 280° C., and the slice region temperature ($T_{sr}$) is controlled to a temperature in a range between 200° C. and 240° C., optionally in a range between 210° C. and 230° C.

5. The method according to claim 1, wherein:

the modelling material is deposited within the build room having a temperature set to a build room temperature ($T_{br}$), at which the crystallinity of the modelling material at a location where at least three tracks meet, the crystallinity in said time range of 0-5 sec. after the new track is deposited is above the remaining crystallinity threshold, when one of said at least three tracks is deposited by the printhead, and the slice region temperature is controlled locally to a temperature ($T_{sr}$) by heating the body at a region surrounding the location where the modelling material is deposited, at which temperature ($T_{sr}$) the crystallinity of the modelling material at a location where at least three tracks meet, is below the remaining crystallinity threshold, optionally is less than 5%, when one of said at least three tracks is deposited by the printhead.

6. The method according to claim 1, wherein:

a plurality of first tracks of three-dimensional modelling material is deposited by the printhead under a first pressure, wherein individual first tracks of the plurality of first tracks are spaced apart so as to leave a gap between them; and a second track of three-dimensional modelling material is deposited by the printhead in each of the gaps between the deposited individual first tracks under a second pressure, which is higher than the first pressure, such that the gaps are filled entirely.

7. An extrusion based additive manufacturing apparatus comprising:

a build room adapted to be heated, a temperature control system to control a process temperature inside the build room, a build base located in the build room to support an object to be manufactured, a print head located in the build room, the print head comprising a nozzle for depositing crystalline or semi-crystalline thermoplastic modelling material to build the object to be manufactured, and the print head comprising a heating device to liquify the modelling material fed to the printhead in an initial solid state, wherein the print head and/or the base are coupled to a 3D positioning system to move the print head and/or the base relative to each other, allowing to deposit tracks of modelling material to build the object to be manufactured, wherein the temperature control system has a "strength mode" and an "aesthetic mode" and is adapted to toggle between said "strength mode" and said "aesthetic mode" while manufacturing the object, wherein:

the control system has a setpoint for the build room temperature which corresponds to the "strength mode", and the apparatus comprises a (precision) cooling device adapted to selectively and locally lower the temperature of the object to a temperature corresponding to the "aesthetic mode"; or the control system has a setpoint for the build room temperature which corresponds to the "aesthetic mode", and the apparatus comprises a (precision) heating device adapted to selectively and locally raise the temperature of the object to a temperature, which corresponds to the "strength mode".

8. The apparatus according to claim 7, wherein the setpoint for the build room temperature corresponding to the "strength mode" is selected for the specific modelling material such that when the crystallinity of the modelling material is determined at a location where at least three tracks meet, the crystallinity is less than a predefined remaining crystallinity threshold when one of said at least three tracks is deposited; and wherein the setpoint for the build room temperature corresponding to the "aesthetic mode" is selected for the specific modelling material such that when the crystallinity of the modelling material is determined at a location where at least three tracks meet, the crystallinity is more than a predefined remaining crystallinity threshold when one of said at least three tracks is deposited.

9. A method for the additive manufacturing of an object of a crystalline or semi-crystalline modelling material having a melting temperature $T_m$, wherein tracks of modelling material are deposited in slices by means of a printhead inside the build room at an extrudate temperature $T_{extr}$, wherein in each slice a plurality of tracks of the crystalline or semi-crystalline thermoplastic modelling material is deposited by the printhead on a build base or on the tracks of a previously deposited slice, wherein:

the temperature of the build room ($T_{br}$) ranges between $2*T_m-T_{extr}+14$ and $2*T_m-T_{extr}+54$ wherein part of the tracks in a slice are printed in an aesthetic mode and part of the tracks are printed in a strength mode, wherein the temperature at a location where at least three tracks meet, in the aesthetic mode is controlled by local cooling and ranges between $2*T_m-T_{extr}-56$ and $2*T_m-T_{extr}+4$, wherein the temperature at a location where at least three tracks, optionally four tracks meet in the strength mode is controlled to be in the range between $*T_m-T_{extr}+14$ and $2*T_m-T_{extr}+54$.

10. The method according to claim 9, wherein the modelling material is PEEK having a $T_m$ of 343° C., wherein $T_{extr}$ ranges between 410° C. and 450° C.

11. The method according to claim 10, wherein $T_{br}$ ranges between 250° C. and 290° C., optionally between 260° C. and 280° C., between 265° C. and 280° C., or between 270° C. and 280° C.

12. A method for determining a process temperature of a build room for additive manufacturing wherein tracks of modelling material are deposited in slices by means of a printhead inside the build room, wherein in each slice a plurality of tracks of a crystalline or semi-crystalline thermoplastic modelling material is deposited by the printhead on a build base or on the tracks of a previously deposited slice, wherein:

the crystallinity of the modelling material is determined at a location where at least three tracks of the previously deposited slice and the currently deposited slice meet, a first process temperature (T1) is determined at which the crystallinity is less than 5% when one of said at least three tracks is deposited, and/or a second process temperature (T2) is determined at which the crystallinity is more than 10% when one of said at least three tracks is deposited.

13. The method according to claim 12, wherein a temperature-time characteristic is determined by a thermal simulation for said location where at least three tracks of the previously deposited slice and the currently deposited slice meet, using a given set of process conditions, and wherein the temperature-time characteristic is used as input in the MEMS-DSC device whereby the crystallinity for this temperature time characteristic is measured.

14. The method according to claim 1, wherein the modelling material is PEEK.

15. The method according to claim 1, wherein the 3D object is made with at least an object portion optimized for shape accuracy and an object portion optimized for strength, wherein the object portion optimized for accuracy has at least 30% better shape accuracy than an object portion optimized for strength, wherein the shape accuracy is determined according to ISO 2768.

16. The method according to claim 1, wherein an object is manufactured from PEEK, the nozzle of the printhead has a diameter of 0.6 mm, the track width is 0.72 mm and the track height is 0.15 mm, and wherein the object has object portions having a shape inaccuracy less than 2 mm according to ISO 2768.

17. The method according to claim 2, wherein:

the modelling material is deposited within the build room having a temperature set to a build room temperature ($T_{br}$), at which the crystallinity of the modelling material at a location where at least three tracks of the previously deposited slice and the currently deposited slice meet, the remaining crystallinity is less than 5% when one of said at least three tracks is deposited by the printhead, and the slice region temperature is controlled locally to a temperature ($T_{sr}$) by cooling the body at a region surrounding the location where the modelling material is deposited, at which temperature ($T_{sr}$) the crystallinity of the modelling material at a location where at least three tracks, optionally four tracks, of the previously deposited slice and the currently deposited slice meet, the remaining crystallinity is more than 10% when one of said at least three, optionally four, tracks is deposited by the printhead, and wherein the modelling material is PEEK and wherein the build room temperature ($T_{br}$) ranges between 260° C. and 300° C., optionally is in a range between 260° C. and 280° C., and the slice region temperature ($T_{sr}$) is controlled to a temperature in a range between 200° C. and 240° C., optionally between 210° C. and 230° C.

18. The method according to claim 2, wherein:

the modelling material is deposited within the build room having a temperature set to a build room temperature (Tor), at which the crystallinity of the modelling material at a location where at least three tracks meet, the crystallinity in said time range of 0-5 sec. after the new track is deposited is above the remaining crystallinity threshold, when one of said at least three tracks is deposited by the printhead, and the slice region temperature is controlled locally to a temperature ($T_{sr}$) by heating the body at a region surrounding the location where the modelling material is deposited, at which temperature ($T_{sr}$) the crystallinity of the modelling material at a location where at least three tracks meet, is below the remaining crystallinity threshold, optionally is less than 5%, when one of said at least three tracks is deposited by the printhead.

19. The method according to claim 2, wherein:

a plurality of first tracks of three-dimensional modelling material is deposited by the printhead under a first pressure, wherein individual first tracks of the plurality of first tracks are spaced apart so as to leave a gap between them; and a second track of three-dimensional modelling material is deposited by the printhead in each of the gaps between the deposited individual first tracks under a second pressure, which is higher than the first pressure, such that the gaps are filled entirely.

20. The method according to claim 17, wherein:

a plurality of first tracks of three-dimensional modelling material is deposited by the printhead under a first pressure, wherein individual first tracks of the plurality of first tracks are spaced apart so as to leave a gap between them; and a second track of three-dimensional modelling material is deposited by the printhead in each of the gaps between the deposited individual first tracks under a second pressure, which is higher than the first pressure, such that the gaps are filled entirely.

\* \* \* \* \*